United States Patent Office 2,856,390
Patented Oct. 14, 1958

2,856,390

ORGANOPHOSPHORUS COMPOUNDS DERIVED FROM ALKYL METHACRYLATES

Harry W. Coover, Jr., and Newton H. Shearer, Jr., Kingsport, Tenn., assignors to Eastman Kodak Company, Rochester, N. Y., a corporation of New Jersey No Drawing. Application September 30, 1953
Serial No. 383,373

9 Claims. (Cl. 260—86.1)

This application relates to a new and valuable class of organophosphorus compounds and polymers derived therefrom. More particularly, this invention relates to carboalkoxypropenephosphonates and phosphonamides and derived polymers. These organophosphorus compounds can be considered as derivatives of alkyl methacrylates.

It is an object of our invention to provide a new and valuable class of organic compounds as described herein. A further object is to provide a process for the preparation of such compounds. Another object of this invention is to provide novel synthetic resins prepared from this new class of compounds. A still further object of this invention is to provide new synthetic resins which have unusual and valuable properties especially in regard to flame-resistance and toughness as well as in other regards. Other objects will become apparent hereinafter.

In accordance with our invention organophosphorus compounds are provided having the following general formula:

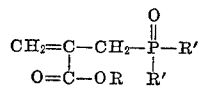

wherein R represents an alkyl radical containing from 1 to 6 carbon atoms and R' represents a substituent selected from the group consisting of —NR"R''' and —OR" radicals wherein R" and R''' each represents a member selected from the group consisting of a hydrogen atom and an alkyl radical containing from 1 to 6 carbon atoms. Examples of these novel compounds include N,N,N',N'-tetrabutyl-2-carbo-n-pentoxy-2-propenephosphondiamide, N,N,N',N'-tetrahexyl - 2 - carbopropoxy - 2 - propenephosphondiamide, diamyl- 2 -carbobutoxy-2-propenephosphonate, etc.

The above defined organophosphorus compounds of this invention can be advantageously prepared by a process comprising reacting an α-halomethacrylate with an alkylphosphite or with an alkyl N,N,N',N'-tetraalkyldiamido phosphite. The reaction can generally be advantageously accomplished by mixing molecularly equivalent quantities of the reactants in a suitable reaction vessel and applying heat to accomplish the reaction. Advantageously, the reaction mixture can be distilled through a column of suitable size and the product collected in good yield. Alternatively, the reactants can be heated to a temperature sufficient to remove alkylhalide by distillation following which the desired product can be recovered by fractionation of the remaining material under reduced pressure. It is believed clearly apparent that the reaction conditions can be considerably modified depending upon the results sought to be accomplished.

The following examples will serve to further illustrate this aspect of our invention:

*Example 1.—N,N,N',N'-tetraethyl-2-carbomethoxy-2-propenephosphondiamide*

A solution of 17.9 g. of methyl α-chloromethylacrylate, 22 g. of ethyl N,N,N',N'-tetraethyldiamidophosphite and 0.1 g. hydroquinone was distilled slowly through a 10-inch column. Ethyl chloride was evolved and the product was collected in good yield, B. P. 167–169° C. at 0.7 mm. of Hg pressure.

*Example 2.—N,N,N',N'-tetramethyl-2-carbomethoxy-2-propenephosphondiamide*

A solution of equivalent quantities of methyl α-chloromethylacrylate and ethyl N,N,N',N'-tetramethyldiamidophosphite and hydroquinone was distilled slowly through a 10-inch column in the same manner as described in Example 1. Ethyl chloride was evolved and the product was collected in good yield.

*Example 3.—Diethyl-2-carbomethoxy-2-propenephosphonate*

17.9 g. of methyl α-bromomethylacrylate and 16.6 g. triethylphosphite were heated in a distillation flask at such a temperature that ethylbromide distilled from the reaction mixture. Heating was continued until the theoretical yield of ethylbromide was collected in the receiver. Fractionation of the remaining material under reduced pressure gave an excellent yield of product, B. P. 172–174° C. at 13 mm. of Hg pressure.

*Example 4.—Dimethyl-2-carbomethoxy-2-propenphosphonate*

Equivalent quantities of methyl α-bromomethylacrylate and trimethylphosphite were heated in a distillation flask at such a temperature that methylbromide distilled from the reaction mixture as described in Example 3. Heating was continued until the theoretical yield of methylbromide was collected in the receiver. Fractionation of the remaining material under reduced pressure gave an excellent yield of product.

*Example 5.—Diethyl-2-carboethoxy-2-propenephosphonate*

Equivalent quantities of ethyl α-bromoethylacrylate and triethylphosphite were heated in a distillation flask at such a temperature that ethylbromide distilled from the reaction mixture as described in Example 3. Heating was continued until the theoretical yield of ethylbromide was collected in the receiver. Fractionation of the remaining material under reduced pressure gave an excellent yield of product.

*Example 6.—Dibutyl-2-carbomethoxy-2-propenephoshonate*

Equivalent quantities of methyl α-bromomethylacrylate and tributylphosphite were heated in a distillation flask at such a temperature that n-butylbromide distilled from the reaction mixture as described in Example 3. Heating was continued until the theoretical yield of n-butylbromide was collected in the receiver. Fractionation of the remaining material under reduced pressure gave an excellent yield of product.

*Example 7.—Diisoamyl-2-carbomethoxy-2-propenephosphonate*

17.9 g. of methyl α-bromomethylacrylate and 16.6 g. triisoamylphosphite were heated in a distillation flask at such a temperature that isoamylbromide distilled from the reaction mixture as described in Example 3. Heating was continued until the theoretical yield of isoamylbromide was collected in the receiver. Fractionation of the remaining material under reduced pressure gave an excellent yield of product.

*Example 8.—Dihexyl-2-carbobutoxy-2-propenephosphonate*

Equivalent quantities of n-butyl α-bromomethylacrylate and tri-n-hexylphosphite were heated in a distillation flask at such a temperature that n-hexylbromide distilled from the reaction mixture. Heating was continued until the theoretical yield of hexylbromide was collected in the receiver. Fractionation of the remaining material under reduced pressure gave an excellent yield of product.

*Example 9.—N,N'-dimethyl-2-carbomethoxy-2-propenephosphondiamide*

A solution of equivalent quantities of methyl α-chloromethylacrylate and ethyl N,N'-dimethyldiamidophosphite along with 0.1 g. hydroquinone was distilled slowly through a 10-inch column as described in Example 1. Methyl chloride was evolved and the product was collected in good yield, B. P. 167–169° C. at 0.7 mm. of Hg pressure.

The organophosphorus compounds which have been described above can be readily polymerized in accordance with methods well known in the art. The temperatures employed are not critical; polymerization can be accomplished at from around room temperature up to about 120° C. with higher or lower temperatures also being utilizable. The temperature employed will proportionately affect the range of molecular weights of the polymer being produced as well as the speed at which the polymerization is accomplished.

Catalysts are not necessarily essential to the polymerization process; however, catalysts which can be employed with advantage include the organic and inorganic peroxy compounds, the organic "azo" catalysts, redox catalysts, etc. Examples of catalysts which can be advantageously employed include sodium perborate, potassium persulfate, ammonium persulfate, benzoyl peroxide, lauroyl peroxide, acetyl peroxide, hydrogen peroxide, azo bis isobutyronitrile, peracetic acid, ammonium percarbonate, potassium perphosphate, etc.

Polymerization can be conducted at atmospheric, subatmospheric, or superatmospheric pressures.

The organophosphorus compound as a monomer can be copolymerized with one or more other monomers to form copolymers. Especially valuable products can be prepared by employing such other monomers as those containing the $CH_2=CH-$ group, the $CH_2=C<$ group, the $-CH=CH-$ group or the $>C=C<$ group.

Examples of such monomers which can be copolymerized with the described organophosphorus compounds include methyl methacrylate, methyl acrylate, ethyl acrylate, diisopropyl fumarate, diethyl maleate, 1,3-butadiene, 2-chloro-1,3-butadiene, 2-fluoro-1,3-butadiene, 2-methyl-1,3-butadiene, acrylonitrile, styrene, vinylidene chloride, vinyl acetate, isopropenyl acetate, trifluorovinyl acetate, tetrafluoroethylene, 1,1-dichloro-2,2-difluoroethylene, etc. The conditions advantageous to the preparation of such copolymers are similar to those set forth above in regard to the preparation of the homopolymers.

The processes of polymerization which can be employed in the preparation of either homo- or copolymers include polymerization in bulk, in solution, or in suspension (i. e., granular or emulsion polymerization in aqueous or other suitable media).

In employing the emulsion polymerization process, it is advantageous to employ a redox system for the catalysis of the polymerization reaction. Thus, the monomers can be added to an aqueous solution containing a dispersing agent to form an emulsion and to which there are added a peroxide type catalyst, such as those listed above, together with a reducing compound known as an activator. Dispersing agents include surface active compounds, such as the alkali metal alkyl-sulfonates, fatty acid salts, etc., e. g. sodium laurate, etc. Activators include compounds such as sodium bisulfite, ferrous sulfate, triethanolamine, etc. The emulsion is kept under agitation during the polymerization, following which the polymer can be precipitated by the addition of a concentrated salt solution. The precipitated polymer can be washed so as to prepare a pure product.

The manner of practicing our invention in regard to the preparation of such polymers is further illustrated by the following examples:

*Example 10.—Homopolymer*

10 g. of N,N,N',N'-tetraethyl-2-carbomethoxy-2-propenephosphondiamide was polymerized at 100° C. in an atmosphere of nitrogen using 0.3% acetyl peroxide. The product obtained was a tough, hard product which could be molded to produce useful shaped objects having excellent physical properties and are completely non-inflammable.

The homopolymers of this invention are completely non-inflammable.

*Example 11.—Homopolymer*

10 g. of dimethyl-2-carbomethoxy-2-propenephosphonate was added to 50 ml. of water containing 1 g. of potassium laurate, 0.2 g. potassium persulfate and 0.2 g. sodium bisulfite. Polymerization was carried out by heating with agitation at 50° C. for 12 hours. The polymer was precipitated by the addition of an unsaturated salt solution. A hard tough product was obtained which was non-inflammable.

*Example 12.—Copolymer*

5 g. of diethyl-2-carboethoxy-2-propenephosphonate, 10 g. methylmethacrylate and 0.2 g. benzoyl peroxide were heated at 80–85° C. for 24 hours. A clear, hard, moldable non-inflammable copolymer was obtained.

*Example 13.—Copolymer*

2 g. of N,N,N',N'-tetramethyl-2-carbomethoxy-2-propenephosphondiamide, 8 g. acrylonitrile, 0.2 g. ammonium persulfate, 0.2 g. sodium bisulfite, and 2 g. potassium laurate were added to 100 ml. of distilled water with agitation. Polymerization began immediately and was complete within 6–8 hours. The polymer precipitated from the solution and was isolated by filtration. The polymer was readily soluble in such solvents as dimethylacetamide and dimethylformamide, and could be spun into fibers having excellent flame-resistance.

*Example 14.—Copolymer*

By using vinyl chloride in the place of acrylonitrile in Example 13, an emulsion polymer was obtained. The polymer so produced was precipitated by the addition of a concentrated salt solution.

*Example 15.—Copolymer*

10 g. dimethyl-2-carbomethoxy-2-propenephosphonate, 10 g. styrene, and 0.2 g. benzoyl peroxide were heated at 80° C. for 15–16 hours. A clear, moldable, non-inflammable polymer was obtained.

Based on the above description and examples it is clearly apparent how other similar polymers can be prepared employing the organophosphorus compounds of this invention either alone or in conjunction with other organic copolymerizable compounds containing olefinic unsaturation as described herein. In general, the higher the concentration of organophosphorus compound in a copolymer, the more resistant the copolymer will be to burning. The homopolymers are non-inflammable.

The process described hereinabove concerning the preparation of the novel organophosphorus compounds and the various polymers thereof can obviously be reorganized in such a manner as to place the production of these products upon a continuous basis. Such continuous processes are clearly described in the prior art in regard to analogous methods of preparing related materials. The polymeric products of this invention are useful in the formation of the various shaped objects referred to hereinabove which can be formed by suitable extrusion, molding, casting, and other conventional operations. Among the products which can be obtained by such operations are sheets, films, fibers, rods, tubes, etc. These

We claim:
1. A process for preparing a compound having the following general formula:

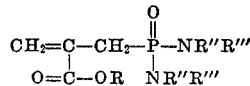

wherein R represents an alkyl radical containing from 1 to 6 carbon atoms and each of R" and R'" represents a member selected from the group consisting of a hydrogen atom and an alkyl radical containing from 1 to 6 carbon atoms, comprising reacting at an elevated temperature an α-halo methacrylate having the following formula:

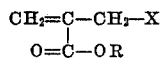

wherein X represents a halogen atom selected from the group consisting of Cl, Br, and I atoms and R is defined above, with an alkyl phosphite derivative having the following formula:

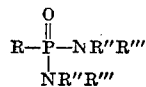

wherein R" and R'" are defined above.

2. A process for preparing N,N,N',N'-tetraethyl-2-carbomethoxy-2-propenephosphondiamide comprising reacting at an elevated temperature methyl α-chloromethacrylate with ethyl N,N,N',N'-tetraethyldiamidophosphite.

3. A process for preparing N,N'-dimethyl-2-carboethoxy-2-propenephosphondiamide comprising reacting at an elevated temperature ethyl α-chloromethylacrylate with ethyl N,N'-dimethyldiamidophosphite.

4. Compounds having the following general formula:

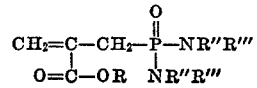

wherein R represents an alkyl radical containing from 1 to 6 carbon atoms and each of R" and R'" represents a member selected from the group consisting of a hydrogen atom and an alkyl radical containing from 1 to 6 carbon atoms.

5. A compound as defined in claim 4 wherein R is a methyl radical, R" is an ethyl radical and R'" is an ethyl radical.

6. A compound as defined in claim 4 wherein R is an ethyl radical, R" is a methyl radical and R'" is a methyl radical.

7. Polymers of a compound having the following general formula:

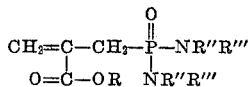

wherein R represents an alkyl radical containing from 1 to 6 carbon atoms and each of R" and R'" represents a member selected from the group consisting of a hydrogen atom and an alkyl radical containing from 1 to 6 carbon atoms.

8. Polymers of N,N,N',N'-tetraethyl-2-carbomethoxy-2-propenephosphondiamide.

9. Polymers of N,N' - dimethyl - 2 - carboethoxy - 2-propenephosphondiamide.

References Cited in the file of this patent

UNITED STATES PATENTS

| | | |
|---|---|---|
| 2,472,811 | Dickey | June 14, 1949 |
| 2,478,441 | Wiley | Aug. 9, 1949 |
| 2,559,854 | Dickey et al. | July 10, 1951 |
| 2,631,162 | Ladd et al. | Mar. 10, 1953 |
| 2,636,027 | Coover et al. | Apr. 21, 1953 |
| 2,652,416 | Coover et al. | Sept. 15, 1953 |
| 2,721,876 | Dickey et al. | Oct. 25, 1955 |
| 2,790,823 | Coover et al. | Apr. 30, 1957 |